(12) United States Patent
Chaudhry

(10) Patent No.: US 11,741,533 B2
(45) Date of Patent: Aug. 29, 2023

(54) PRODUCT DATABASE SYSTEMS AND METHODS ENABLING THE FILTERING OF PRODUCTS AND ENHANCING CUSTOMER ACCESS

(71) Applicant: Walmart Apollo, LLC, Bentonville, AR (US)

(72) Inventor: Seema Chaudhry, Woodside, CA (US)

(73) Assignee: Walmart Apollo, LLC, Bentonville, AR (US)

(*) Notice: Subject to any disclaimer, the term of this patent is extended or adjusted under 35 U.S.C. 154(b) by 893 days.

(21) Appl. No.: 16/601,796

(22) Filed: Oct. 15, 2019

(65) Prior Publication Data

US 2020/0118199 A1    Apr. 16, 2020

Related U.S. Application Data

(60) Provisional application No. 62/746,157, filed on Oct. 16, 2018.

(51) Int. Cl.
*G06Q 30/00* (2023.01)
*G06Q 30/0601* (2023.01)
(Continued)

(52) U.S. Cl.
CPC ....... *G06Q 30/0643* (2013.01); *G06F 16/908* (2019.01); *G06F 16/9035* (2019.01); *G06F 16/9038* (2019.01); *G06Q 30/0283* (2013.01)

(58) Field of Classification Search
CPC ............ G06Q 30/0643; G06Q 30/0283; G06F 16/9038; G06F 16/9035; G06F 16/908
(Continued)

(56) References Cited

U.S. PATENT DOCUMENTS 6,266,649 B1   7/2001 Linden
6,629,079 B1   9/2003 Spiegel
(Continued)

OTHER PUBLICATIONS

"Celebrating 90 Years of Business, Stumps Party Unveils New Shopping Experience for Event Planners," NASDAQ OMX's News Release Distribution Channel [New York] Nov. 14, 2016; Dialog #1838632940, 2pgs. (Year: 2016).*
(Continued)

*Primary Examiner* — Robert M Pond
(74) *Attorney, Agent, or Firm* — Fitch, Even, Tabin & Flannery LLP

(57) ABSTRACT

In some embodiments, systems manage databases for multiple event shopping, comprising: a plurality of distributed database management systems comprising: a management control circuit; a filter control circuit; customer event databases; and a plurality of product databases maintaining current product information sets, each product information set comprises: product information corresponding to one of the hundreds of thousands of retail products, and an association to at least one of a plurality of different event filter categorizations; wherein the filter control circuit is configured to filter product information sets, and identify a limited subset of products; wherein the management control circuit is configured to: maintain the plurality of customer event databases; cause a graphical user interface to limit a display of potential products to display a subset of product representations; and incorporate within a first event database a product identifier for each selected product.

20 Claims, 12 Drawing Sheets

(51) Int. Cl.
   *G06F 16/9035* (2019.01)
   *G06F 16/908* (2019.01)
   *G06Q 30/0283* (2023.01)
   *G06F 16/9038* (2019.01)

(58) Field of Classification Search
   USPC .................................................. 705/26, 27
   See application file for complete search history.

(56) References Cited

U.S. PATENT DOCUMENTS

| | | | |
|---|---|---|---|
| 7,236,976 B2* | 6/2007 | Breitenbach | G06Q 10/109 |
| | | | 707/999.102 |
| 7,783,527 B2 | 8/2010 | Bonner | |
| 9,911,149 B2 | 3/2018 | Allen | |
| 9,928,535 B2 | 3/2018 | Kumar | |
| 10,621,648 B2* | 4/2020 | Davis | G06Q 30/0631 |
| 2002/0016729 A1* | 2/2002 | Breitenbach | G06Q 10/06311 |
| | | | 707/999.1 |
| 2007/0073593 A1 | 3/2007 | Perry | |
| 2010/0205045 A1 | 8/2010 | Zhang | |
| 2011/0191222 A1* | 8/2011 | Mashiach | G06Q 10/06 |
| | | | 709/204 |
| 2013/0198026 A1* | 8/2013 | Platzker | G06Q 30/0611 |
| | | | 705/26.4 |
| 2014/0019298 A1 | 1/2014 | Suchet | |
| 2019/0370881 A1* | 12/2019 | Davis | G06Q 30/0631 |

OTHER PUBLICATIONS

Burningmoth; "WooCommerce Multiple Carts Per User"; https://codecanyon.net/item/woocommercemultiplecartsperuser/14274432; Jan. 25, 2016; pp. 1-3.

* cited by examiner

PRODUCT DATABASE SYSTEMS AND METHODS ENABLING THE FILTERING OF PRODUCTS AND ENHANCING CUSTOMER ACCESS

CROSS-REFERENCE TO RELATED APPLICATION

This application claims the benefit of U.S. Provisional Application No. 62/746,157 filed Oct. 16, 2018, which is incorporated herein by reference in its entirety.

TECHNICAL FIELD

This invention relates generally to databases and the management of databases.

BACKGROUND

Shopping for products can be time consuming and cumbersome. Finding relevant and desired products can also be difficult. Accordingly, there is a need to improve shopping experiences.

BRIEF DESCRIPTION OF THE DRAWINGS

Disclosed herein are embodiments of systems, apparatuses and methods pertaining databases and the management of databases to limit products presented to customers based on their relevance to an event. This description includes drawings, wherein.

Figure 1:
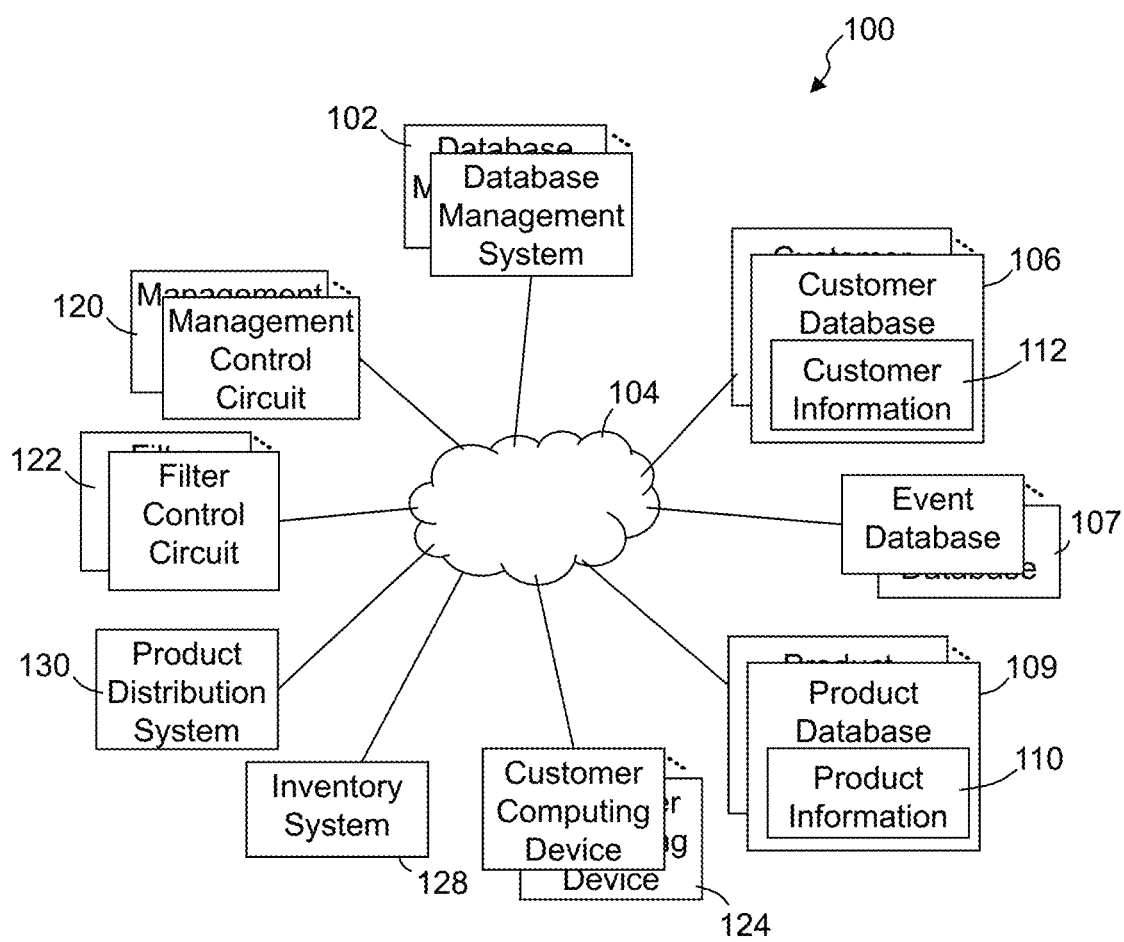
FIG. 1 illustrates a simplified block diagram of an exemplary online retail management system, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

It has been identified that one of the major problems and drawbacks with enabling customers to shop for retail products is a determination of which products to present and which to exclude. Physical retail stores enable a retailer to present all of their available products on the floor allowing customers to move through the retail store to view and consider products for purchase. Customers shopping online, however, cannot be presented with all products on a single displayed web site as customers would quickly move away from that retailer because of the difficulty in navigating through the available products and the cumbersome shopping experience. Accordingly, it is an inherent problem of online shopping to present limited products to customers that are relevant to customers. Within online shopping the products presented can be restricted, and further can be focused in order to keep customers using and returning to the site. Thus, the online-centric problem exists of filtering to be applied in determining which of the hundreds of thousands of products to be presented to the online shopping customer, and how to present that content to the customer.

Some embodiments address this interne centric problem through the application of uncharacteristic rules that are applied to filter available products to identify potential products to be presented to the customer. Further, this filtering improves the performance of online retail servers by enhancing performance and reducing delay times in presenting products to an online customer. Still further, some embodiments provide a database that improves online storage and cooperation between products to enhance the filtering and thus further improve server operations and reduce delays.

Generally speaking, pursuant to various embodiments, systems, apparatuses and methods are provided herein useful to manage databases for multiple event shopping. In some embodiments, systems to manage databases for multiple event shopping comprise: a plurality of geographically distributed database management systems configured to maintain customer database information corresponding to thousands of different registered customers and product database information corresponding to hundreds of thousands of retail products offered for sale from a retail store entity, the database management system comprising: a management control circuit; a filter control circuit communicatively coupled with the management control circuit; customer event databases each corresponding to one of the registered customers and exclusively associated with one of one or more customer identified events that a corresponding customer is planning; and a plurality of product databases maintaining current product information sets each corresponding to one of the hundreds of thousands of products, wherein each product information set comprises: product information corresponding to one of the hundreds of thousands of retail products, and an association to at least one of a plurality of different event filter categorizations; wherein the filter control circuit is configured to filter product information sets based on a set of predefined event attributes and customer specified attributes maintained within a first customer event database exclusively associated with the customer and a first event of the plurality of events, and identify a limited subset of products, of the hundreds of thousands of available products offered for sale by the retail entity, that are relevant to the user specified first event; wherein the management control circuit is configured to: maintain the plurality of customer event databases exclusively associated with a first customer of the registered customer; cause a graphical user interface, displayed through a customer computing device, to limit a display of potential products to display a subset of product representations, of hundreds of thousands of potential product representations of the hundreds of thousands of products offered for sale by the retail entity, wherein each product representation of the subset of product representations corresponds to one of the subset of products to be considered for purchase by the first customer for use with the first event; and incorporate within a first event database of the plurality of customer event databases, which corresponds to the first event exclusively associated with the first customer, a product identifier for each selected product from the subset of products that are selected by the first customer and intended to be purchased and used by the first customer for the first event.

Further, some embodiments provide methods that enable event based shopping and maintain event specific shopping cart databases. Some such embodiments provide methods of managing databases for multiple event shopping, comprising: maintaining a plurality of customer event databases exclusively associated with the first customer, wherein each of the plurality of event databases corresponds to one of a plurality of customer identified events that a corresponding customer is planning; filtering product information sets based on a set of predefined event attributes and customer specified attributes maintained within a first customer event database exclusively associated with the customer and a first event of the plurality of events, and identifying a limited subset of products, of the hundreds of thousands of available products offered for sale by the retail entity, that are relevant to the user specified first event; causing a graphical user interface, displayed through a customer computing device, to limit a display of potential products to display a subset of product representations, of hundreds of thousands of potential product representations of the hundreds of thousands of products offered for sale by the retail entity, wherein each product representation of the subset of product representations corresponds to one of the subset of products to be considered for purchase by the first customer for use with the first event; and incorporating within a first event database of the plurality of customer event databases, which corresponds to the first event exclusively associated with the first customer, a product identifier for each selected product from the subset of products that are selected by the first customer and intended to be purchased and used by the first customer for the first event.

FIG. 1 illustrates a simplified block diagram of an exemplary online retail management system 100, in accordance with some embodiments. In part, the management system 100 manages databases enabling multiple event shopping. The retail management system 100 includes plurality of geographically distributed database management systems 102 and/or servers communicatively coupled over one or more computer and/or communication networks 104 with multiple distributed databases maintained on database storage devices. Typically, the distributed databased include redundancy to enhance a speed of access, provide back-up protection of the data, increase reliability, reduce latency and other such benefits. Some of the databases are configured to maintain one or more customer databases 106 storing and organizing customer database information 112 corresponding to thousands of different registered customers, and one or more product databases 109 storing and organizing product information corresponding to hundreds of thousands of retail products offered for sale from one or more retail store entities.

The database management systems 102 includes one or more management control circuit 120 and a filter control circuit 122 communicatively coupled with the management control circuit. Further, the database management systems are communicatively coupled with and/or include one or more customer event databases 107, which typically are part of the customer databases 106 but in some instances may be maintained separate from the customer databases. The customer event databases 107 each correspond to one of thousands and typically tens of thousands or more registered customers, and each is exclusively associated with one of one or more customer identified events that the corresponding customer is planning.

The plurality of product databases 109 maintain current product information sets 110 each corresponding to one of the hundreds of thousands of products potentially available to be presented to the online shopping customers. In some embodiments, the product information set includes product identifier information, product barcode number, product serial number, product description information, product category information, product characteristics information, other such product information, or typically a combination of two or more of such product information that corresponds to one of the hundreds of thousands of retail products, and an association to at least one of a plurality of different event filter categorizations. Further, some embodiments include one or more inventory systems 128 to track inventory relative to one or more retail stores, retail fulfillment centers, distribution centers and/or other such retail facilities. The inventor information can further be utilized in limiting what products are presented to customers based on available inventor and/or predicted available inventory. Still further, some embodiments includes one or more product distribution control systems 130 and/or product distribution systems. The distribution control system is configured to evaluate distribution resources relative to a pickup location and a destination location, select one or more modes of distribution and issue instructions to cause the distribution of inventory. Such distribution may be between a distribution center and a retail store, between a distribution center and a fulfillment center, between a fulfillment center and a customer's delivery address, between a retail store and a customer's delivery address, other such distributions, and/or a combination of such distributions.

The filter control circuit 122 is configured to apply at least one set of one or more filtering rules to filter product information sets based on a set of predefined event attributes and customer specified attributes maintained within one or more customer event databases 107 maintained as part of the customer databases 106 exclusively associated with a particular customer and a first event of the plurality of events. Some examples of such attributes can include but are not limited to one or more of time of year, association with a holiday, size information, quantity information, serving size information, event type associations, event specific attributes, cultural, indoor, outdoor, cost, cost per serving, quality information, history satisfaction ratings, customer preferences, availability, shelf life, characteristics (e.g., color(s), size, dimensions, materials, and the like), and other such attributes. In some applications the product database maintains attribute information relative to different types of events, such as but not limited to whether a product is relevant to a type of event, an association with one or more sub-categories corresponding to an event, other such attribute information, and typically a combination of such attribute information. Based on the application of the one or more rules and the identification of associations between product information and the predefined event attributes and customer specified attributes, the filter control circuit can identify a limited subset of products, of the hundreds of thousands of available products offered for sale by the retail entity, that are relevant to the customer specified first event for which the customer is currently shopping. The filtering association greatly improves the speed and efficiency of the retail management system 100 by in part reducing the processing overhead, reducing the data to be processed and solves one of the limitations of online shopping by limiting the numbers of products to present to the customer. Similarly, the filtering association greatly increases the relevance of the products presented to the customer while greatly reducing the numbers of potential products to present to the customer during a current online shopping experience.

In some embodiments, the management control circuit 120 is configured to maintain the plurality of customer event databases exclusively associated with each of the registered customers that utilize and take advantage of the online retail management system 100. As described further below, these event databases reduce the processing performed by the retail management system, improve the operating speed and performance of the system, improve the filtering of data, reduce the time to provide relevant information, and other such system benefits, while providing the customers with an enhanced shopping experience. Additionally, the management control circuit, in some applications, maintains a separate online shopping cart database for each event associated with a customer, with a listing of products intended and/or desired to be purchased and/or already purchases relative to the particular event, and an accumulated estimated cost. Accordingly, in some embodiments, the retail management system simultaneously maintains multiple different event based online carts for multiple different events for which the specific customer is planning and/or shopping.

Figure 2:
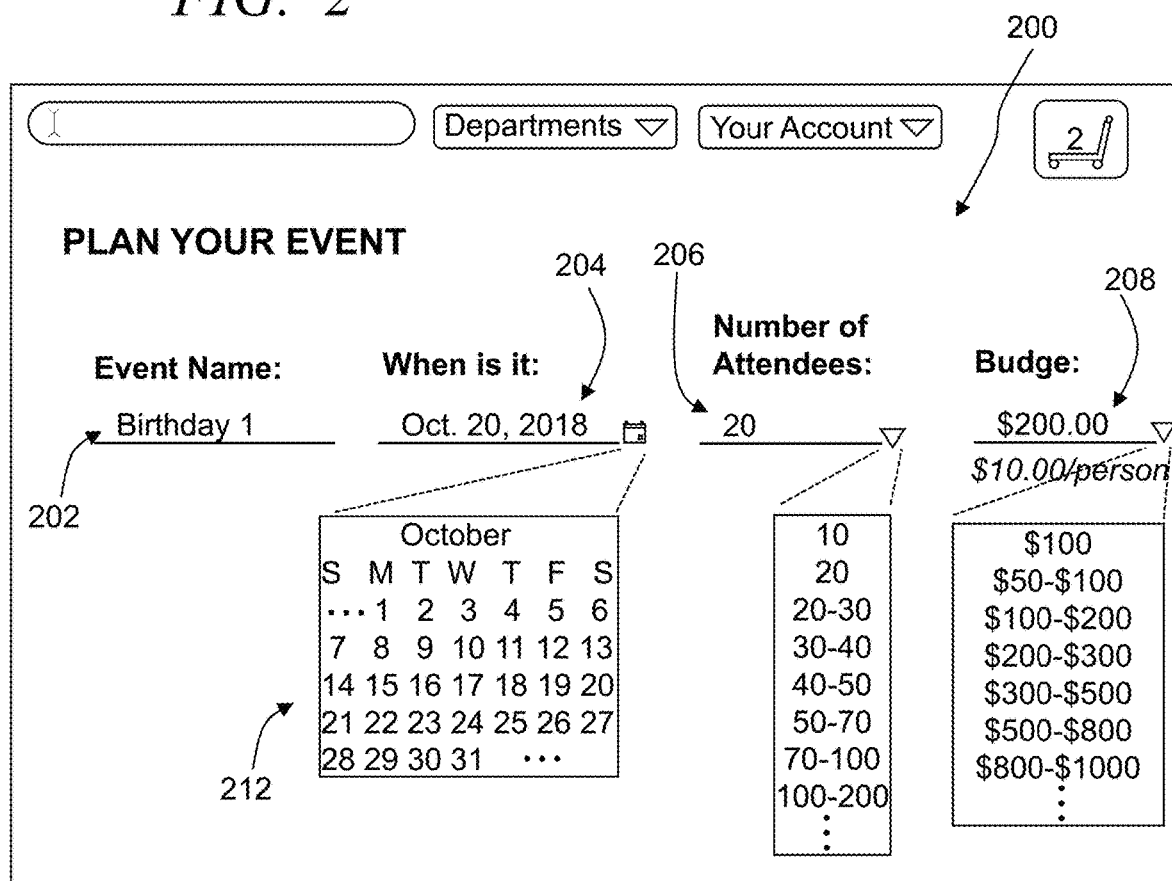
FIG. 2 illustrates a simplified representation of an exemplary event planning graphical user interface, in accordance with some embodiments.

FIG. 2 illustrates a simplified representation of an exemplary event planning graphical user interface 200, in accordance with some embodiments. Typically, the event planning interface 200 enables a customer to specify an event name or title option 202, a date of the event option 204, a number of attendees option 206 allowing the customer to specify a number of people attending the event, and in some implementations a budget option 208. The options may allow the user to type in the information. In some implementations, one or more of the options may include a dropdown menu that helps the customer fill in the option. For example, some dropdown options may include but is not limited to one or more of a calendar 212 to select an event date, a listing numbers and/or ranges of attendees (e.g., 10, 20, 10-20, 20-30, 40-50, 60-80, 80-100, etc.), a budget listing and/or range of budgets (e.g., $100, $150, $200, $50-$100, $100-$200, $200-$300, $300-$500, $600-$800, etc.).

Figure 3:
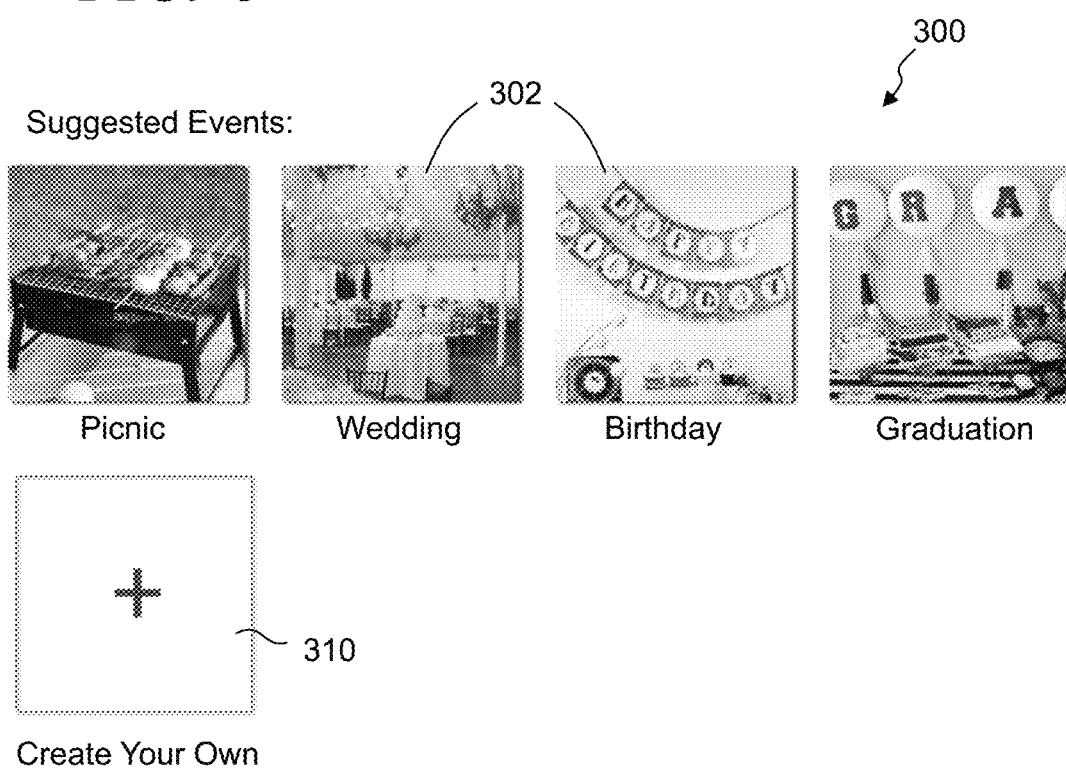
FIG. 3 illustrates a simplified representation of an exemplary event selection graphical user interface, in accordance with some embodiments.

In establish the event, the management control circuit enables the customer to specify a type of event, select one of a plurality of predefined events, and/or establish one or more additional predefined events. FIG. 3 illustrates a simplified representation of an exemplary event selection graphical user interface 300, in accordance with some embodiments. The event selection user interface 300 includes multiple selectable options 302 of predefined events (e.g., picnic, wedding, birthday, graduation, office event, and other such events). Some embodiments additionally include an event defining option 310 that allows a customer to create their own event, which can activate another user interface providing options to define a type of event, and/or select parameters to define the characteristics of the event.

Further, the management control circuit 120 is configured to cause a graphical user interface to be displayed (e.g., through a customer computing device 124) to limit a display of potential products to display a subset of product representations, of the hundreds of thousands of potential product representations of the hundreds of thousands of products offered for sale by the retail entity. Typically, each product representation of the subset of product representations corresponds to one of the subset of products to be considered for purchase by a particular customer for use with a particular event in which the customer intends to participate and/or that the customer is planning. In some embodiments, the management control circuit 120 is further configured to incorporate within a particular event database (e.g., a first event database) of the plurality of customer event databases, which corresponds to a first of the particular events exclusively associated with the particular customer, at least a product identifier for each selected product from the subset of products that are selected by the customer and intended to be purchased and used by the customer for the particular first event, and an association of that product identifier with the specific event.

The presented products graphical user interface further enables the customer to scan through different filtered products in selecting the products to be used for the event. In some embodiments, the filter control circuit 122 is configured to identify a plurality of product sub-categories associated with the first event. One or more of these sub-categories are event specific, while others may be more generic. Such sub-categories may include, for example, main course, side-dishes, appetizers, non-alcoholic drinks, alcoholic drinks, place settings (e.g., utensils, plates, placemats, table coverings, napkins, etc.), decorations, cups/glassware, lighting, deserts, other such sub-categorizes, and typically a combination of two or more of such sub-categories. Graphical representations can be accessed in the products database for these different sub-categories. Some embodiments display representations of the product sub-categories to the customer through the customer's computing device, and typically display them as selectable options that can be selected by the user through the graphical user interface. These sub-categories further reduces the numbers of products to be presented to the customer, and simplifies the shopping experience for the customer. In some embodiments, the product database further defines the association of one or more products to the one or more different sub-categories. This association, in some implementations, is further restricted to a corresponding event, while in other implementations, the association between a product and a sub-category may extend to multiple different events when a sub-category and/or the product is relevant to the one or more other different events. The product database, in some application for example, maintains identifiers for different events and incorporates those events that are relevant to a sub-category, and/or maintains identifiers for different sub-categories and associates that sub-category identifiers with one or more different events.

In response to receiving a selection and/or other identification of one or more of the representations of the product sub-categories of products to present, the filter control circuit is configured to parse the product databases and obtain, from the product databases, sub-category associations for each of the subset of products that define an association of products to the sub-category. The management control circuit 120 in cooperation with the product database causes a graphical user interface to display at least some of the subset of product representations corresponding to the selected sub-category. Again, each of the product representations is typically a selectable option displayed through the graphical user interface and/or a selectable option is associated with and displayed adjacent the product representation. One or more other information can be displayed in association with the product representations, such as but not limited to product name and/or title, source of the product and/or product manufacturer, pricing information, estimated pricing per person, weight, quantity, size information, dimensions, count, description, or other such information.

Figure 4:
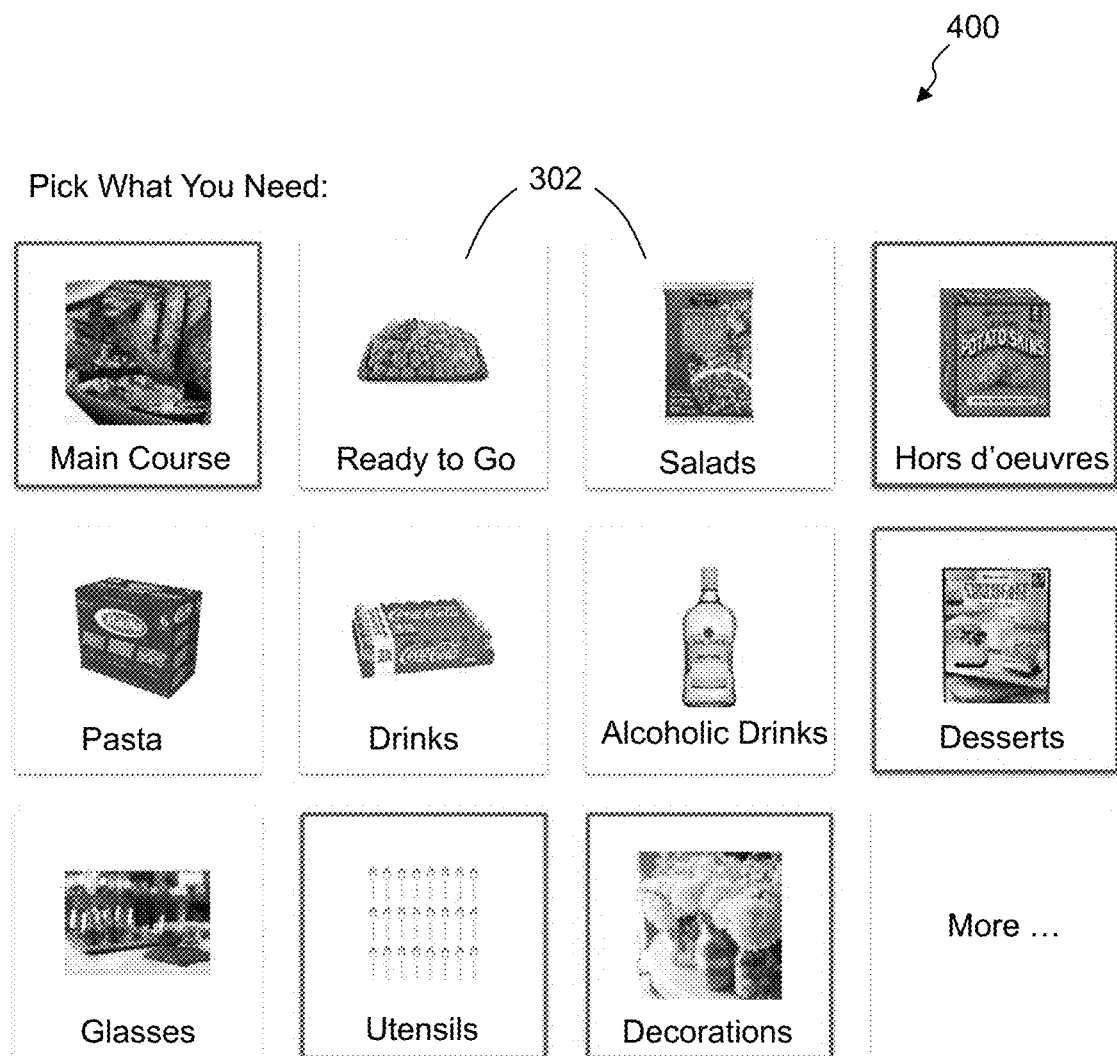
FIG. 4 illustrates a simplified representation of an exemplary product categories graphical user interface, in accordance with some embodiments.

FIG. 4 illustrates a simplified representation of a product categories graphical user interface 400 product categories graphical user interface 400, in accordance with some embodiments. In some embodiments, the product category user interface 400 includes multiple different selectable category options 402 corresponding to categories of products that are relevant to the event being planned. Such product categories may include one or more of, but are not limited to, main course category, side dishes category, pre-prepared platers and other such products category, finger foods category, salads category, starters or hors d'oeuvres category, pasta category, non-alcoholic drinks category, alcoholic drinks category, kids food category, desserts category, place settings category, cups and/or glassware category, cutlery and/or utensils category, decorations category, lighting category, party favors category, snacks category, and other such categories. This products categories user interface may, in some implementations, be activated in response to a selection of an event defining option 310 and/or an event option 302 from the event selection user interface 300. The potential categories included in the products category user interface is typically limited based on the event for which the customer is planning, such as in response to a selection of one of the predefined event options 302. In other instances, the product category user interface may be accessed through an option available through one or more other user interfaces, such as a product category option that provides a direct link to the product category user interface. In some embodiments, the customer can select one or more of the product category options before selecting a continue option 404, shop, or other such option to advance to one or more product selection user interfaces corresponding to those categories selected. In other implementations, the selection of one of the category options advances the customer to a product selection user interface.

The product database further defines at least a two tier filtering criteria for at least some and typically most of not all of the product. A first filtering tier included within the product database defines events for which products are relevant, and in some applications additionally defines the second tier of product categories for which the products are associated. Applying the filtering rules the filter control circuit utilizes the selected event to limit which product categories are available. Similarly, the filter control circuit additionally applies one or more sets of filtering rules to further limit which products are presented to the customer based on product category selected. As such, the product database establish a multiple tier filtering to limit which products are presented to a customer based on the event being planned.

Figure 5:
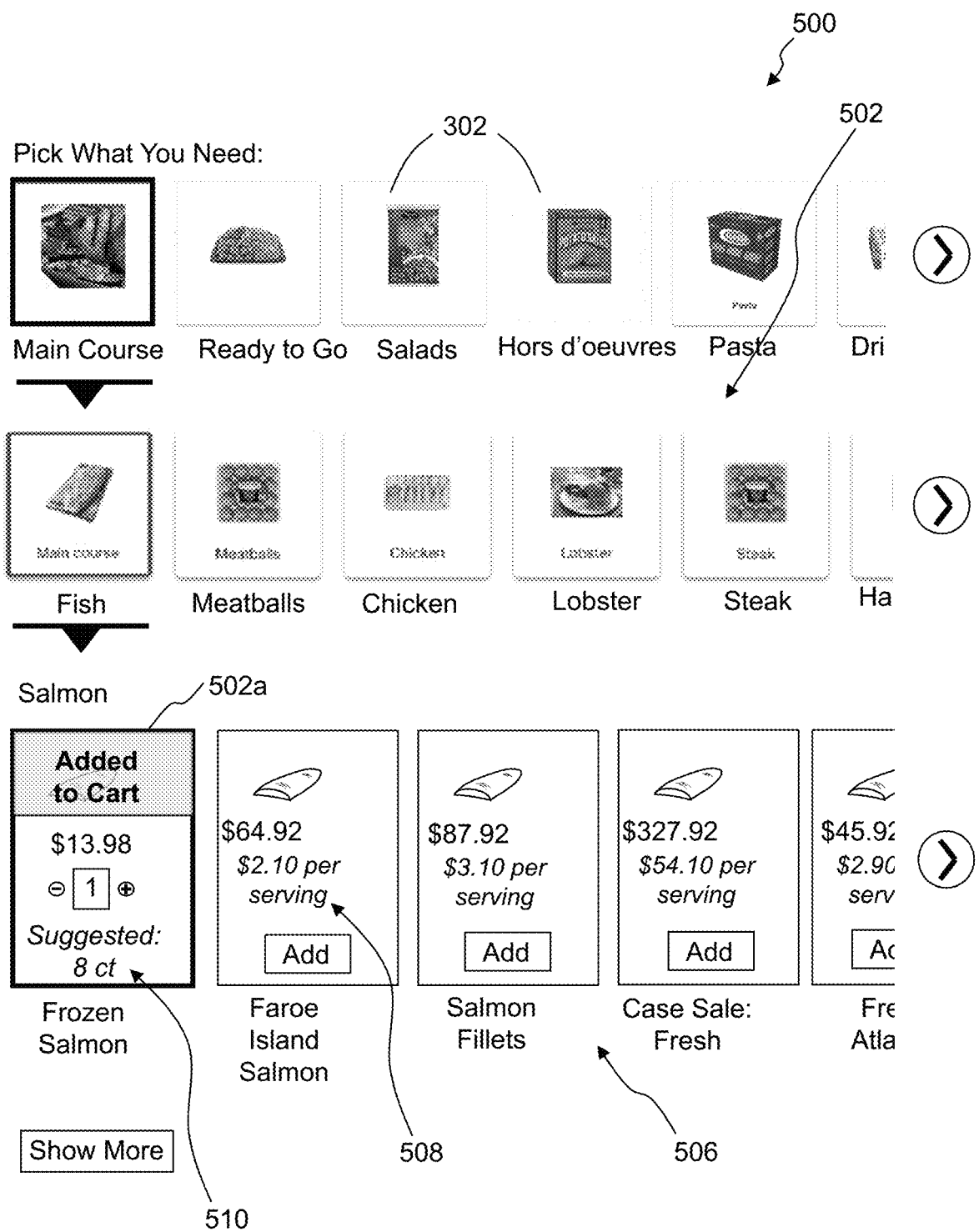
FIG. 5 illustrates a simplified representation of an exemplary product categories graphical user interface, in accordance with some embodiments, further displaying multiple product sub-categories.

The product database often defines for one or more of the products one or more product sub-categories and/or one or more tiers of product categories. Utilizing these product sub-categories, the filter control circuit can identify one or more relevant product sub-categories in response to a selected category option 402, and the management control circuit can cause one or more product categories graphical user interfaces to be displayed. FIG. 5 illustrates a simplified representation of an exemplary product categories graphical user interface 500, in accordance with some embodiments, further displaying multiple product sub-categories 502. For example, based on a selection of a "Main Course" option selection, the filter control circuit can identify first sub-categories 502 corresponding to the Main Course option, such as but not limited to one or more of fish, meatballs, chicken, lobster, steak, hamburger, hotdog, lasagna, and other such options. The filter control circuit, in applying one or more filtering rules limits products to be presented to the customer based on the event being shopped for as well as the one or more product categories and/or product sub-categories. For example, the filter control circuity in applying one or more filtering rules limits the displayed products to series or listing of fish products 506 in response to a selection of a fish product sub-category 502a. In some embodiments, the product information includes a cost for the product. Still further, some embodiments display a cost per serving 508 and/or a cost per attendee. Additionally, some embodiments display a suggested quantity or count 510 of the number of a particular product that should be purchased based on the previously specified number of attendees for the event.

In some embodiments, the management control circuit further populates the customer event databases 107 with information corresponding to the respective events as that information is acquired over time. For example, the customer event databases can include an event database specific to each event being planned and/or for which a customer is shopping. This even database can further be exclusively associated with the particular customer. The event database can maintain information about the specific event such as date of the event, number of expected and/or invited attendees or participants, one or more corresponding event budgets, other such information, and typically a combination of two or more of such information. Using a specific event database, the management control circuit 120 obtains a number of attendees predicted to attend the event, which is typically specified by the customer. The product database may further specify an estimated number of servings per purchased product (e.g., based on count, based on weight, etc.). In some instances, the product database may further adjust such information over time based on feedback from customers, quantities purchased by other customer and the like to obtain a more accurate predicted quantity per serving that a quantity specified by a supplier or manufacturer. Using the number of attendees and the product information, the management control circuit, in some embodiments, causes an estimated purchase quantity of each of the displayed product representations to be displayed in association with the displayed product representations through the graphical user interface. Similarly, in some applications the management control circuit may further cause an accumulated current cost to purchase the estimated purchase quantity of each of the displayed product representations to be displayed through the graphical user interface in association with the displayed product representations and that estimated quantity of that product, and/or similarly may display a cost per estimated attendee and/or per estimated serving.

In some embodiments, the management control circuit 120 is configured to receive an event budget defined by the customer that is specific for the particular first event. In response to receiving the customer's budget, the management control circuit 120 can incorporate the event budget into a budget record of the corresponding event database. In some applications the management control circuit causes a graphical user interface to be displayed with one or more displayed selectable options, which include a budget option that upon activation enables the customer to specify a budget for the event. The budget option may be specified as a fixed total budget. Additionally or alternatively, the budget may be specified as a budget per person, a budget per sub-category of the event (e.g., food budget, drink budget, desert budget, place setting budget, entertainment budget, and/or other such budgets), other such budget options, or a combination of such budgets. Similarly, the management control circuit may issue instructions to a software application operated on the customer computing device 124 that in response to the instruction displays the one or more budget options and/or the relevant graphical user interface. Still further, in some embodiments, the management control circuit may pre-populate the budget with a proposed or recommended budget, or multiple proposed budgets can be optionally presented (e.g., with a breakdown of cost per person presented, cost per sub-category of the event presented, etc.). This proposed budget may be based on the type of event (e.g., greater budget for a wedding than a birthday party, greater budget for a birthday or holiday party than a holiday barbeque, and the like), the number of people expected to participate in the event, this customer's purchase history and habits, other customers' purchase histories and/or habits associated with the event for which the customer is shopping, other such factors, or typically a combination of such factors. Similarly, the proposed budget may be dependent on the expected number of people attending. For example, proposed budget may be determined as a factor of the total number of people invited and/or expected to attend. As a specific example, the budget per person may be less as the number of people invited and/or expected to attend increases in an attempt to reduce to total budget. Again, such aspects may be dependent on the customer's prior history and purchasing history. As a customer continues to utilize the retail management system 100 to shop for different events, the management control circuit tracks the shopping to detect patterns, preferences, habits, and the like, which can be used to estimate a proposed budget.

As presented above, in some embodiments, the customer event databases 107 can maintain an event budget for each corresponding event. Similarly, the management control circuit can accumulate costs of products selected intended to be purchased and determine a relationship between the event budget and the accumulated cost. Additionally, in some applications, the management control circuit can be configured to determine one or more additional relationships relative to the event budget and potential accumulated costs, such as costs of products in a "wish list" or "potential" list associated with the specific event. In some embodiments, the management control circuit 120 is configured to receive the event budget, which is typically defined or accepted by the customer. This event budget is specific for the event that the customer is planning and for which the customer is shopping or intends to shop. The event database is updated to incorporate the event budget into the corresponding budget record of the event database. The management control circuit can further obtain, for each product selected by the customer for the particular event, from product information a current cost of that product, and can track a total cost based on the selected products and the quantities of those selected products. Similarly, the management control circuit can track the total cost relative to the event budget. In some embodiments, the management control circuit is configured to cause a graphical user interface to be displayed that graphically represents a relationship between a current total cost, defined by sum of the current cost for each of the selected products, relative to the event budget specific for the event of interest.

Figure 6:
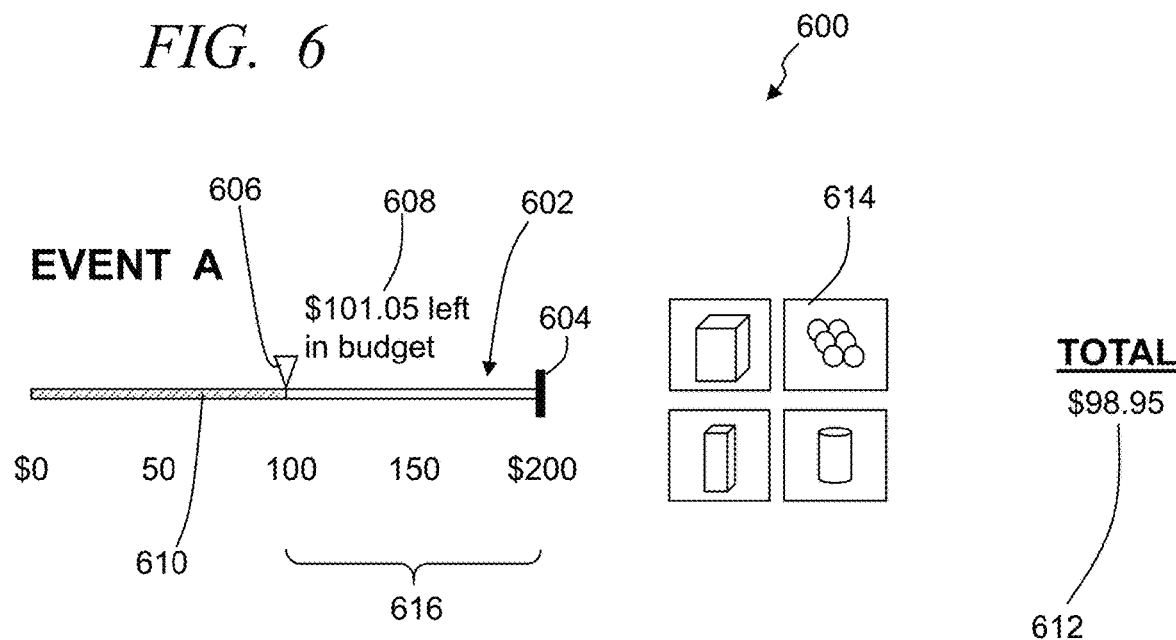
FIG. 6 illustrates a simplified representation of an exemplary budget allocation interface, in accordance with some embodiments.

FIG. 6 illustrates a simplified representation of an exemplary budget allocation interface 600, which may be a separate graphical user interface or part of another graphical user interface, in accordance with some embodiments. In this exemplary representation, budget allocation interface includes a cost bar 602 with a total budget indicator 604 positioned along the bar, and a current accumulated cost indicator 606. Some embodiments may further include a graphical indication, alphanumeric indicator 608 and/or other such indicator of a remainder and/or overage of the budget. In some embodiments, the cost bar may include multiple sections, such as a current accumulation total section 610 graphically illustrating a total accumulation along the cost bar. Some embodiments may further include cost indicators (e.g., $0, $50, $100, $150, $200, etc.). Still further, some embodiments may include a total current cost 612 identifying a current total accumulated cost for products selected for the event. In some embodiments, one or more product representations 614 of one or more selected products may also be displayed for one or more products selected for the identified event. The management control circuit, in some applications, is configured to cause the graphical user interface to display, in association with the graphically represented relationship between the current total cost and the event budget, one or more product or image representations 614 of a subset of one or more the selected products representing a reduction in the event budget. Similarly, in some applications, the management control circuit causes a graphical representation 616 of a proportion of the first event budget that continues to be available when the total current cost is less than the event budget.

Figure 7:
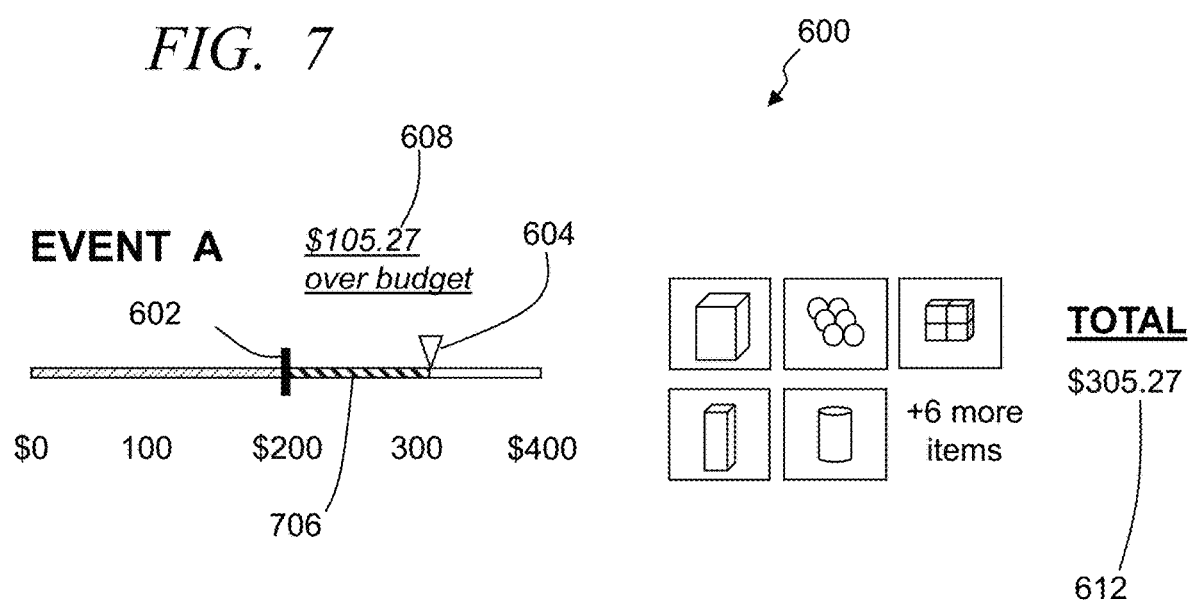
FIG. 7 illustrates a simplified representation of an exemplary budget allocation interface, in accordance with some embodiments.

FIG. 7 illustrates a simplified representation of an exemplary budget allocation interface 700 showing an instance where an event has exceeded the event budget for the particular event, in accordance with some embodiments. In this example, the current accumulated cost indicator 606 is past the total budget indicator 604. In some embodiments, the management control circuit causes an excess graphical representation 706 along a proportion of the cost bar illustrating a proportional cost in excess of the event budget when the total current cost exceeds the event budget. Additionally or alternatively, the budget allocation interface may present the alphanumeric indicator 608 identifying a quantity in excess of the budget. In some applications, the alphanumeric indicator may use a different font, color, text size and/or the like when the cost has exceeded the event budget so as to be disgusted from the alphanumeric indicator when the total cost is less than the event budget.

Figure 8A:
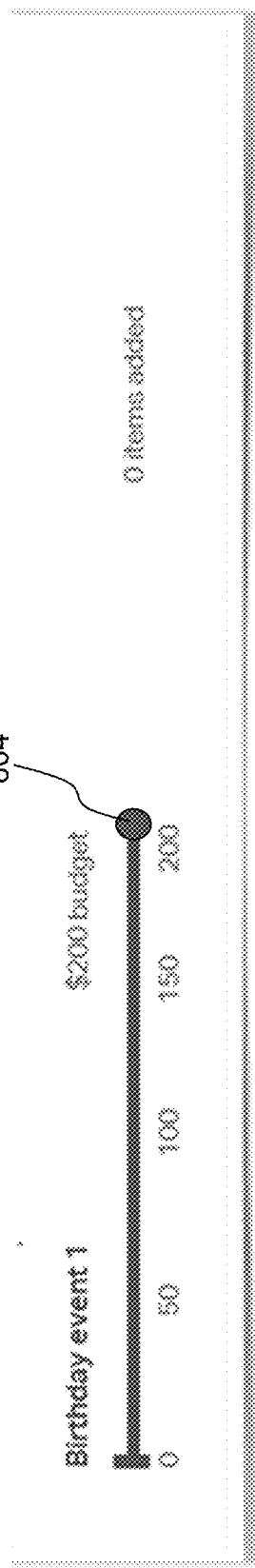
FIGS. 8A-8C illustrate simplified representations of exemplary budget allocation interfaces over time, in accordance with some embodiments.
Figure 8B:
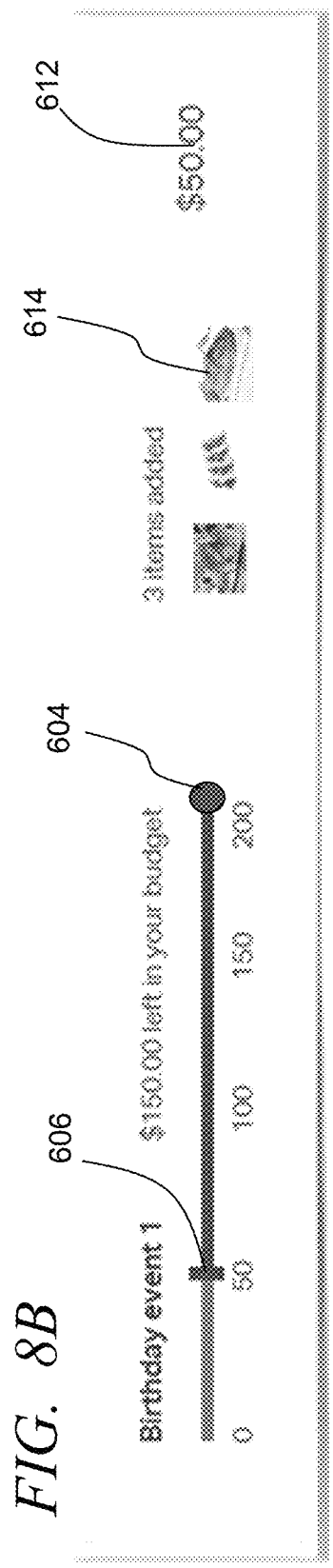
Figure 8C:
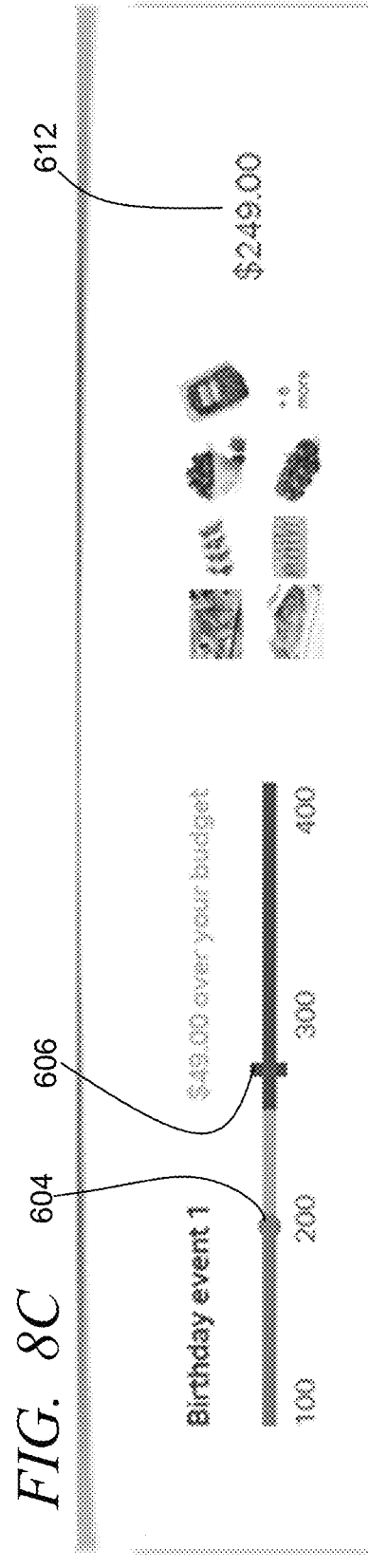

FIGS. 8A-8C sequentially illustrate simplified representations of an exemplary budget allocation interface 600 over time as products are added to a corresponding event, in accordance with some embodiments. FIG. 8A shows the set budget (e.g., $200) with no products selected and added to the corresponding event. FIG. 8B illustrates the budget allocation interface after three products have been selected and added to the event. Typically, the budget allocation interface can include total budget indicator 604 positioned along the bar, and a current accumulated cost indicator 606. Additionally, in some embodiments, the budget allocation interface provide a total current cost 612 identifying a current total accumulated cost for products selected for the event. FIG. 8C illustrates an example when the cost of the selected products exceeds a budget 604, in accordance with some embodiments.

In some embodiments, the management control circuit 120 and/or filter control circuit 122 are further configured to enhance the operation of the online system by continuing to evaluate over time a customer's events and the products selected for that event in an attempt to improve the customer's experience. In some applications, for example, the management control circuit 120 identifies when pricing of one or more products has changes and/or is scheduled to change, and can evaluate event databases with which a customer as selected one of the one or more products. Similarly, the management control circuit 120 can evaluate other modifications such as the introduction or expected termination of rebates, the issuance of a coupon relative to a product, an offer of reduced cost for a second and/or subsequent product with the purchase of first product (e.g., buy one, get one free), changes and/or expected changes in stock levels and/or expected availability of products proximate to a scheduled time of a customer's event, and/or other such information. In some embodiments, filter control circuit is configured to identify when one of the selected products is offered at a reduced cost. In some instances, for example, the filter control circuit receives a notification of a change in cost of a first product and applies one or more filtering rules to identify customers and corresponding event databases where that product has been selected. The filter control circuit and/or the management control circuit based on receiving a report or alert from the filter control circuit can cause a notification to be communicated to the customer of the reduced cost, and in some applications further notifies the customer of a change in total cost relative to the corresponding event budget. Still further, in some applications, timing information may be communicated to the customer regarding how long the change in price is expected to be available. Additionally, in some applications, the management control circuit considers a timing of the event and whether the timing of the discount is within a threshold time of the date of the event. For example, when the product being offered at the reduced cost is perishable, a shelf life of the product can be compared to the event date to determine whether to recommend purchasing the product. When the shelf life is greater than the duration until the event date, the management control circuit in many instances would not notify the customer and/or would not recommend purchasing the product for the event at that time.

Some embodiments additionally provide an improved database by defining an association between products, a date of an event and a potential window of time for purchasing the products. The product database can include one or more recommended dates of purchase and/or windows of dates of purchase corresponding to times when it is advantages to purchase products for an event and/or not advantageous to purchase products. For example, products with relatively short shelf life would be defined with a shorter purchase window than products with a longer shelf life. Similarly, products with expiration dates would limit their purchase window to times prior to the expiration date, while products without expiration dates would have a greater window and may not be limited by a particular termination date. The management control circuit, in some implementations, is configured identify a change in date and/or identify a future window of time corresponding to a current date, and evaluate the event databases relative to scheduled dates of customers' events. In some embodiments, the management control circuit is configured to determine a purchase timing or window for each of the selected products relative to an event, and evaluate each of the purchase timing relative to a scheduled event time attribute defined by the customer. The customer can be notified of a recommended purchase date and/or purchase window of time for one or more the selected products as a function of the corresponding purchase timing. A set of one or more purchase rules can be applied to the date of a scheduled event and the products can be evaluated to identify products that are within a purchase timing relative to the date of the event. This purchase timing can be defined within the product database relative to at least products with limited shelf lives. Further, in some applications the purchase rules can take into consideration a time of year (e.g., hotter temperatures may reduce the shelf life of some products), a priority of the product relative to the event, the cost, whether a product has been or is going to be reduced in price, and/or other such factors. For example, some embodiments apply a rule to identify a shelf life of a product of being less than seven (3) days, sets a purchasing time to be within six days prior to the scheduled event to provide a margin of error and/or satisfaction, and further considers expected dates when the product is to go on sale (e.g., three days prior to the event), and can issue a recommendation to purchase the product three days prior to the event. Similarly, some embodiments modify recommendations for product so that a recommendation can recommend the purchase of more than a single product as customers often prefer to purchase multiple items instead of individually over multiple different times. As such, even though two or more products may have a purchase timing or window of three months, the recommendation to purchase these products can be delayed so that a recommendation is communicated after a threshold number of products are within their respective purchase windows. The threshold may vary depending on the types of products, the type of event, and/or other such factors.

In some embodiments, the management control circuit is configured to display through the graphical user interface a pending events option. In some instances the events options can be selectable options that when selected provide information corresponding to the elected event as maintained in the corresponding event database. Additionally or alternatively, a listing of the pending event items can be displayed that are associated with that customer. Each of the displayed pending event items displayed corresponds to one of the pending events specified by the customer. Some embodiments provide additional information through this pending events graphical user interface corresponding to the different events. For example, in some embodiments, the pending events interface can display an identifier of an event along with a total current cost defined by a sum of the selected product intended for the corresponding one of the pending events.

Figure 9:
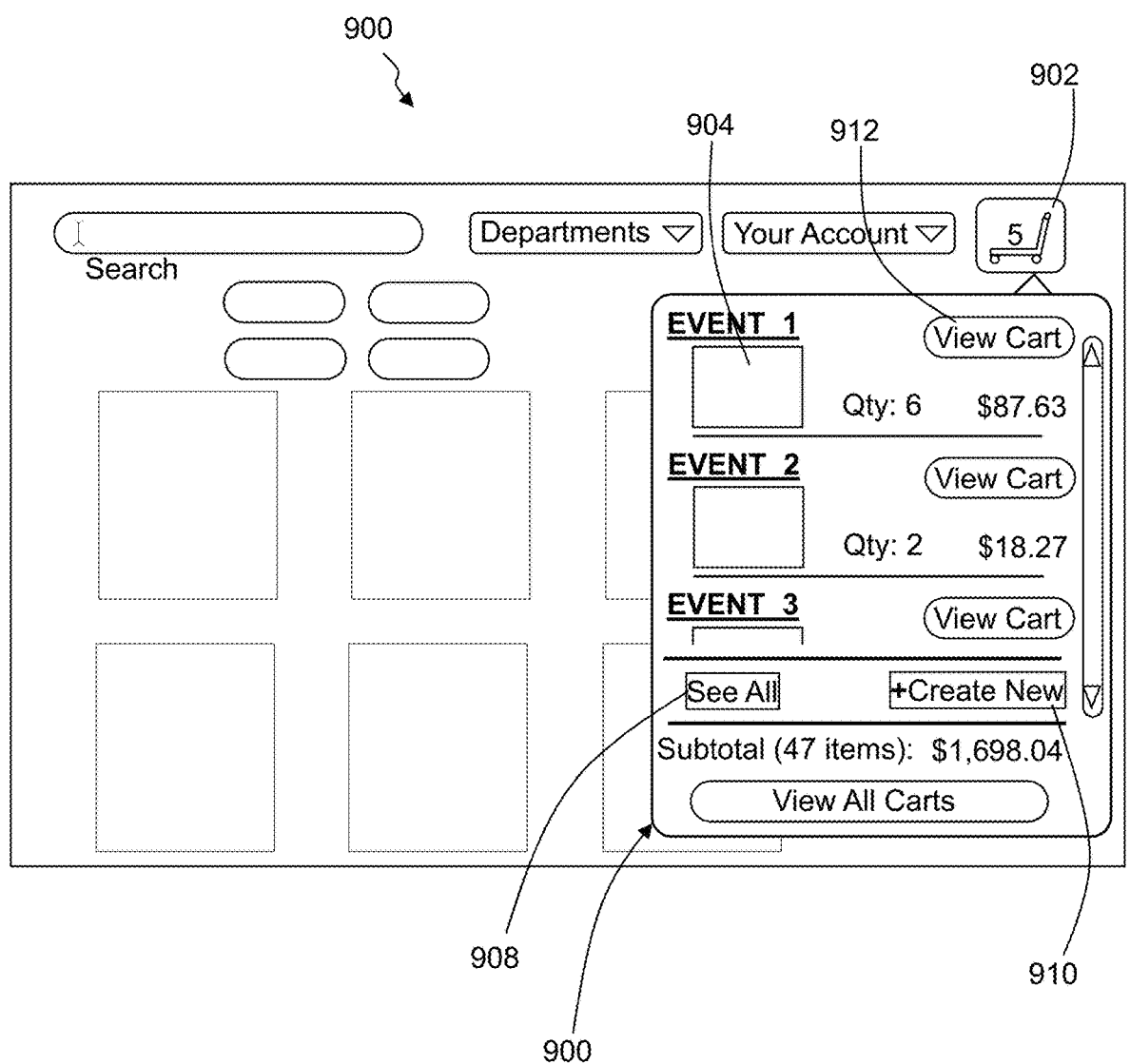
FIG. 9 illustrates a simplified representation of an exemplary pending events user interface, in accordance with some embodiments.

FIG. 9 illustrates a simplified representation of an exemplary pending events user interface 900, in accordance with some embodiments. The pending events interface 900 may be displayed on its own, or displayed with another interface or within another interface. In the illustrated example, the pending event interface is presented in response to a customer, logged into an account associated with that customer, and presented in response to a selection of a selectable option or icon, such as an event or cart option 902. In this example, the cart option 902 indicates a number of pending events and/or carts corresponding to that customer (e.g., 5 carts). The pending events user interface can display a listing of some or all of the carts/events, and/or present the different carts/events as a listing, with a control to move through the listing when extending beyond the boundaries of the pending events interface. The pending event user interface includes graphic representations 904 or icons corresponding to each event or cart. A title may be included (e.g., Jack's Birthday, Jill's Wedding, Picnic, Christmas, Weekly List, Bi-Weekly List, Graduation, Trip_1, or the like). Again, in some application, each pending event item is selectable and/or includes a selectable option to cause a detailed event graphical user interface to be display that is exclusively associated with a selected one of the pending events corresponding to the selected one of the pending event items. Additionally or alternatively, a view option 912 may be provided to cause an event graphical user interface to be displayed corresponding to the specific event, the details about the specific event, options and/or links to product information, cost information, budget information, other such information, and typically a combination of two or more of such information. In some instances, the pending events user interface may include an option 908 to see all pending events/carts, a new event option 910 to create a new event and corresponding cart, cost information, quantity information, and/or other such information.

Figure 10:
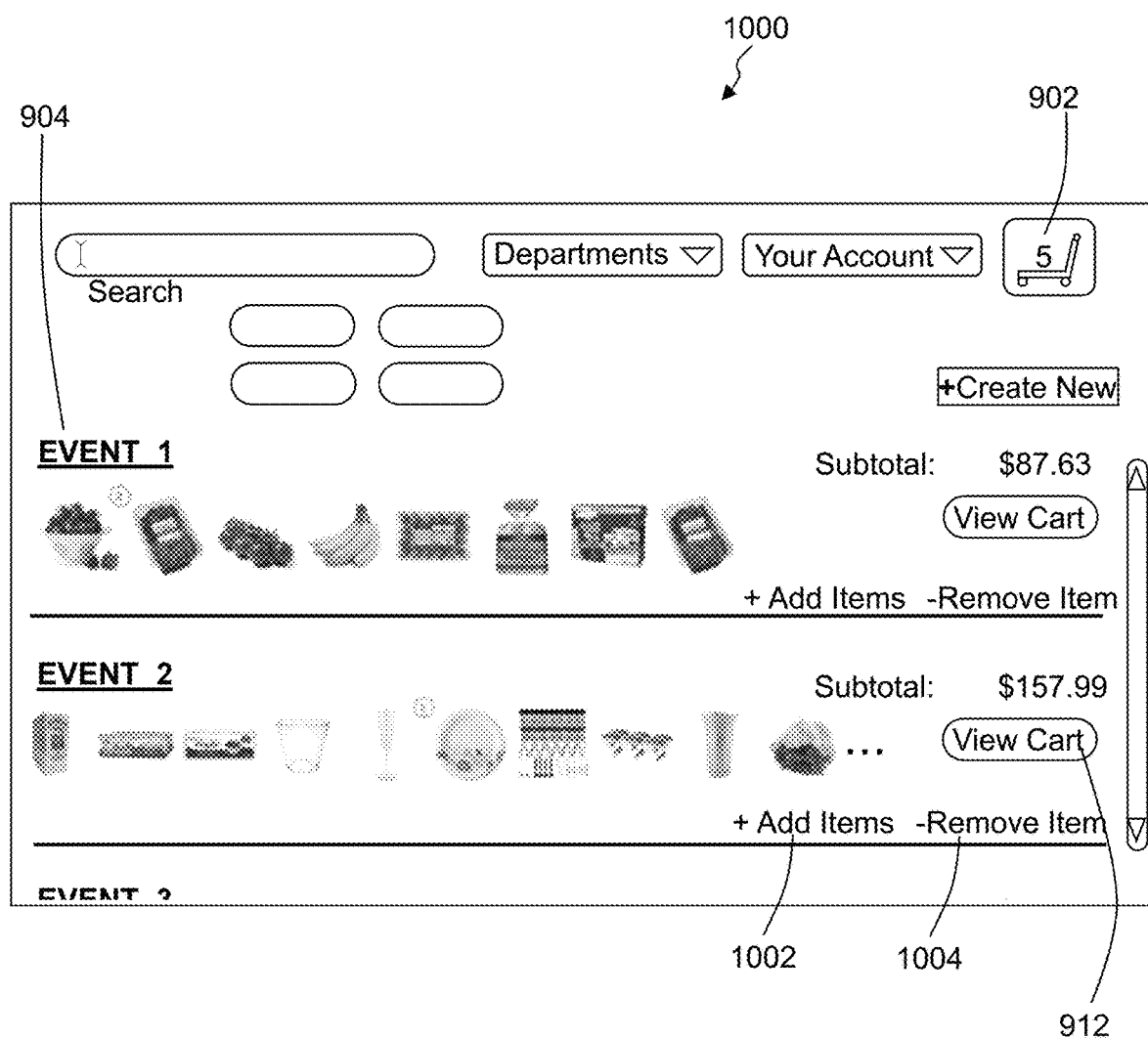
FIG. 10 illustrates a simplified representation of another exemplary pending events user interface, in accordance with some embodiments.

FIG. 10 illustrates a simplified representation of another exemplary pending events user interface 1000, in accordance with some embodiments. The pending events user interface can include a listing of events or cart option 902. In this example, the interface provides a listing of pending events corresponding to that customer, which typically includes a graphic representations, option and/or icons corresponding to each event or cart, which is in some instances may be a title of the event or cart, and which may be selectable to cause a corresponding detailed event graphical user interface to be display. Additionally or alternatively, a view option 912 may be provided. The interface, in some applications, may include an add item option 1002 that activates the filter control circuit to filter products relative to the event and corresponding attributes to present products and/or categories of products (e.g., such as in FIGS. 4-5) to allow the customer to add or remove one or more products from the event. Similarly, some embodiments may provide a remove option 1004 that when activated allows a customer to select one or more items to be removed from association with the event. Alternatively, a single modify option may be provided. In some instances, the pending events user interface may include graphic representations of some or all of the items currently selected to be purchased or potentially purchased for the event. Other information may also be included, such as but not limited to cost information, quantity information, and/or other such information.

Figure 11:
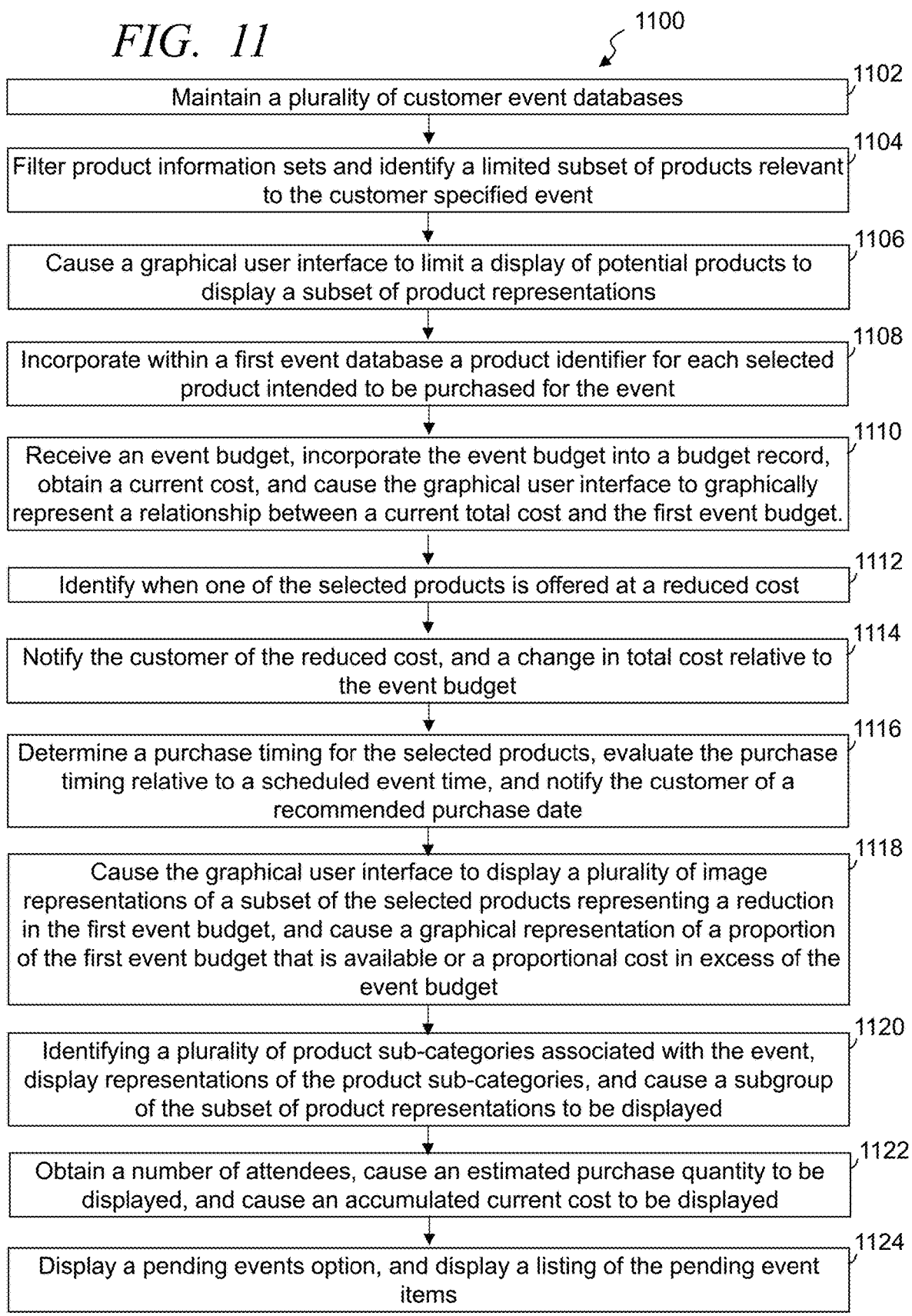
FIG. 11 illustrates a simplified flow diagram of an exemplary process of managing databases, in accordance with some embodiments.

FIG. 11 illustrates a simplified flow diagram of an exemplary process 1100 of managing databases, in accordance with some embodiments, that enhances a system to provide access to product information with reduced latency, more accuracy, and more relevance. Further, the process in part applies filtering rules to limit product information to address drawbacks of online shopping. Still further, the process manages databases to provide multiple event shopping. In step 1102, a plurality of customer event databases are maintained. These customer event databases are exclusively associated with a particular customer (e.g., first customer). Additionally, in some implementations each of the plurality of event databases corresponds to one of a plurality of customer identified events the first customer is planning. In step 1104, one or more sets of one or more filtering rules are applied to filter product information sets based on a set of predefined event attributes and customer specified attributes maintained within a first customer event database exclusively associated with the customer and a first event of the plurality of events. The product information sets are accessed in the product databases. Based on the filtering, a limited subset of products, of the hundreds of thousands of available products offered for sale by the retail entity, are identified that are relevant to the customer specified first event.

In step 1106, a graphical user interface is caused to be displayed through a customer computing device and that limits a display of potential products to display a subset of product representations, of hundreds of thousands of potential product representations each corresponding to one of the hundreds of thousands of products offered for sale by the retail entity. Typically, each product representation of the subset of product representations corresponds to one of the subset of products to be considered for purchase by the first customer for use with the first event associated with the first customer. In step 1108, the system detects a selection of one or more products of the subset and a product identifier for each selected product from the subset of products that are selected by the first customer and intended to be purchased and used by the first customer for the first event is incorporate within a first event database of the plurality of customer event databases, which corresponds to the first event exclusively associated with the first customer.

Some embodiments include step 1110 where a first event budget is received that is defined by the customer and that is specific for the first event. The first event budget is incorporated into a budget record of the first event database. A current cost can be obtained for each of the selected products from product information maintained in the one or more product databases. The graphical user interface can be further configured to graphically represent a relationship between a current total cost, defined by sum of the current cost for each of the selected products, and the first event budget.

In some embodiments, the process 1100 includes step 1112 to identify when one or more of the selected products is offered at a reduced cost and/or a cost is changed for one or more. In step 1114, a notification is communicated to the customer regarding the reduced cost and/or the change in cost. In some applications, a change in the total cost relative to the first event budget can additionally be communicated. The process 1100, in some implementations, includes step 1116 where a purchase timing is determined for each of the selected products. Each purchase timing is evaluated relative to a scheduled event time attribute defined by the customer, and the customer is notified of a recommended purchase date for each of one or more of the selected products as a function of the corresponding purchase timing.

Some embodiments include step 1118 to cause a graphical user interface to display, in association with the graphically represented relationship between the current total cost and the first event budget, a plurality of image representations of at least a subset of the selected products representing a reduction in the first event budget, and cause a graphical representation of a proportion of the first event budget is available when the total current cost is less than the first event budget, and an excess graphical representation of a proportional cost in excess of the first budget when the total current cost exceeds the first event budget. In some embodiments, step 1120 is included where a plurality of product sub-categories associated with the first event are identified, and representations of the product sub-categories can be displayed. Sub-category associations for each of the subset of products obtaining from the product database, and when causing the graphical user interface to display the subset of product representations can include causing, in response to a selection of one of the representations of the product sub-categories, a subgroup of the subset of product representations to be displayed that are associated with the selected product sub-category.

Some embodiments include step 1122 where a number of attendees scheduled and/or predicted to attend the first event is obtained. Typically, the number of attendees is specified by the customer. An estimated purchase quantity of each of the displayed product representations can be displayed in association with the displayed product representations through the graphical user interface. Further, some embodiments cause an accumulated current cost to purchase the estimated purchase quantity of each of the displayed product representations to be displayed through the graphical user interface in association with the displayed product representations.

In some embodiments the process includes step 1124 where a pending events option is displayed through the graphical user interface, and a listing of the pending event items may be displayed each corresponding to one of the pending events specified by the customer along with a total current cost defined by a sum of the selected product intended for the corresponding one of the pending events. In some implementations, each pending event item is selectable to cause the graphical user interface to display event information exclusively associated with a selected one of the pending events corresponding to the selected one of the pending event items. One or more of the steps and/or one or more sets of one or more steps may be repeated.

Figure 12:
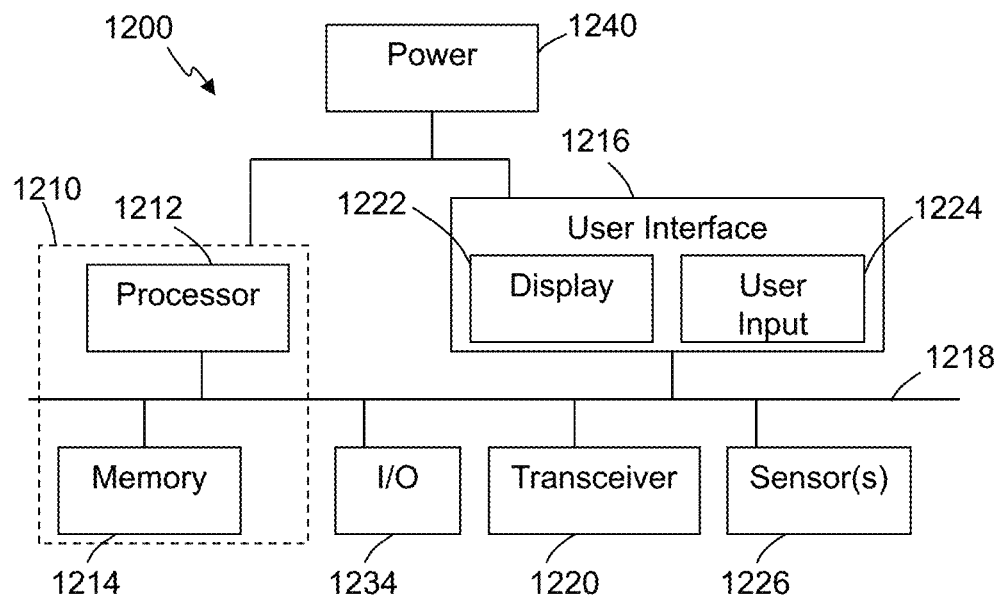
FIG. 12 illustrates an exemplary system for use in implementing methods, techniques, devices, apparatuses, systems, servers, sources and maintaining databases and applying filtering to the databases to limit products to those of having relevance.

Further, the circuits, circuitry, systems, devices, processes, methods, techniques, functionality, services, servers, sources and the like described herein may be utilized, implemented and/or run on many different types of devices and/or systems. FIG. 12 illustrates an exemplary system 1200 that may be used for implementing any of the components, circuits, circuitry, systems, functionality, apparatuses, processes, or devices of retail management system 100, and/or other above or below mentioned systems or devices, or parts of such circuits, circuitry, functionality, systems, apparatuses, processes, or devices. However, the use of the system 1200 or any portion thereof is certainly not required.

By way of example, the system 1200 may comprise a control circuit or processor module 1212, memory 1214, and one or more communication links, paths, buses or the like 1218. Some embodiments may include one or more user interfaces 1216, and/or one or more internal and/or external power sources or supplies 1240. The control circuit 1212 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 1212 can be part of control circuitry and/or a control system 1210, which may be implemented through one or more processors with access to one or more memory 1214 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 1200 may be used to implement one or more of the above or below, or parts of, components, circuits, systems, processes and the like.

The user interface 1216 can allow a user to interact with the system 1200 and receive information through the system. In some instances, the user interface 1216 includes a display 1222 and/or one or more user inputs 1224, such as buttons, touch screen, track ball, keyboard, mouse, etc., which can be part of or wired or wirelessly coupled with the system 1200. Typically, the system 1200 further includes one or more communication interfaces, ports, transceivers 1220 and the like allowing the system 1200 to communicate over a communication bus, a distributed computer and/or communication network 104 (e.g., a local area network (LAN), the Internet, wide area network (WAN), etc.), communication link 1218, other networks or communication channels with other devices and/or other such communications or combination of two or more of such communication methods. Further the transceiver 1220 can be configured for wired, wireless, optical, fiber optical cable, satellite, or other such communication configurations or combinations of two or more of such communications. Some embodiments include one or more input/output (I/O) ports 1234 that allow one or more devices to couple with the system 1200. The I/O ports can be substantially any relevant port or combinations of ports, such as but not limited to USB, Ethernet, or other such ports. The I/O interface 1234 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 1226 to provide information to the system and/or sensor information that is communicated to another component. The sensors can include substantially any relevant sensor, such optical-based scanning sensors to sense and read optical patterns (e.g., bar codes), radio frequency identification (RFID) tag reader sensors capable of reading RFID tags in proximity to the sensor, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 1200 comprises an example of a control and/or processor-based system with the control circuit 1212. Again, the control circuit 1212 can be implemented through one or more processors, controllers, central processing units, logic, software and the like. Further, in some implementations the control circuit 1212 may provide multiprocessor functionality.

The memory 1214, which can be accessed by the control circuit 1212, typically includes one or more processor-readable and/or computer-readable media accessed by at least the control circuit 1212, and can include volatile and/or nonvolatile media, such as RAM, ROM, EEPROM, flash memory and/or other memory technology. Further, the memory 1214 is shown as internal to the control system 1210; however, the memory 1214 can be internal, external or a combination of internal and external memory. Similarly, some or all of the memory 1214 can be internal, external or a combination of internal and external memory of the control circuit 1212. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network 104. The memory 1214 can store code, software, executables, scripts, data, content, lists, programming, programs, log or history data, user information, customer information, product information, and the like. While FIG. 12 illustrates the various components being coupled together via a bus, it is understood that the various components may actually be coupled to the control circuit and/or one or more other components directly.

Some embodiment provide a retail online database system that includes a plurality of geographically distributed database management systems configured to maintain customer database information corresponding to thousands of different registered customers and product database information corresponding to hundreds of thousands of retail products offered for sale from a retail store entity. In some implementations, the database management system comprises a management control circuit, and a filter control circuit that is communicatively coupled with the management control circuit. Customer databases are maintained with each corresponding to one of the registered customers and comprising at least one event record corresponding to an event for which the customer is planning and/or shopping. The system further maintains and/or accesses a plurality of product databases that maintain current product information sets each corresponding to one of the hundreds of thousands of products offered for sale by the retail entity. Each product information set can include product information corresponding to one of the hundreds of thousands of retail products, and an association to at least one of a plurality of different event filter categorizations and a relationship to that event filter categorization. Some embodiments include a network shopping server that implements the management control circuit 120 and/or the filter control circuit 122, or is communicatively coupled with at least the filter control circuit and is accessible over the Internet by millions of potential customers. The network shopping server is configured to cause, for each potential customer accessing the network shopping server, a customer shopping graphical user interface to be displayed on a customer electronic device. The filter control circuit, in some embodiments is configured to receive an identifier of a customer from the network shopping server and access, within the customer database, a corresponding customer database exclusively associated with the particular customer. The management control circuit and/or network shopping server further enables customers to each establish multiple different event records that each correspond to a different one of multiple different events for which the customer plans to purchase products. Each of the different events can, for example, correspond to one of multiple different predefined types of events, or in some instances can be defined by the customer. The filter control circuit is further configured to obtain one or more sets of event filters corresponding to the type of event. Typically, event records corresponds to events for which the customers plan to purchase products and the events can correspond to one of multiple different types of events. The one or more sets of event filters can be applied to the product information in one or more product databased to identify a subset of products that are relevant to the type of event. The filter control circuit can cause a restricted quantity of product representations corresponding to the subset of products to be presented to the customer through a graphical user interface for consideration for purchase by the customer to be used in association with the particular event. In some embodiments, the filter control circuit additionally or alternatively accesses one or more event rules from a rules database, and applies the one or more event rules to the customer database to identify an event of one or more registered events previously registered by the customer. Similarly, one or more event filter rules from the rules database can be accessed and applied to the plurality of product information sets based on at least an event filter categorization defined for the first event. This filtering enhances the speed and operation of the system, reduces latency, and addresses an inherent problem of shopping online. Further, the system provides greater support to customers, enables the system to allow customers to simultaneously maintain multiple different events and/or shopping carts, simplifies the shopping experience for customer, helps to organize customer, and other such benefits. Additionally, the system utilizes the product filtering to identify products corresponding to an event and to cross-sell products through at least the event association. Some embodiments provide notifications of changes in pricing. Such notifications can be through the one or more graphical user interfaces, through email, text messages, in context messages, phone messages, audible alters and/or other such communications. Still further, the system can use the customer's address and/or delivery address along with inventory information, product information (e.g., expiration dates, estimated shelf life), and the event information (e.g., date and time of event) to predict a day or window for when to place an order and/or to purchase the product, which may take into consideration delivery times. Similarly, the system can provide information about delivery versus self pick up. Still further, some embodiments enable a customer to pre-order products for future delivery and/or pick-up ensuring the product is available at the time of need and allowing the system to more effectively manage inventory.

Figure 13:
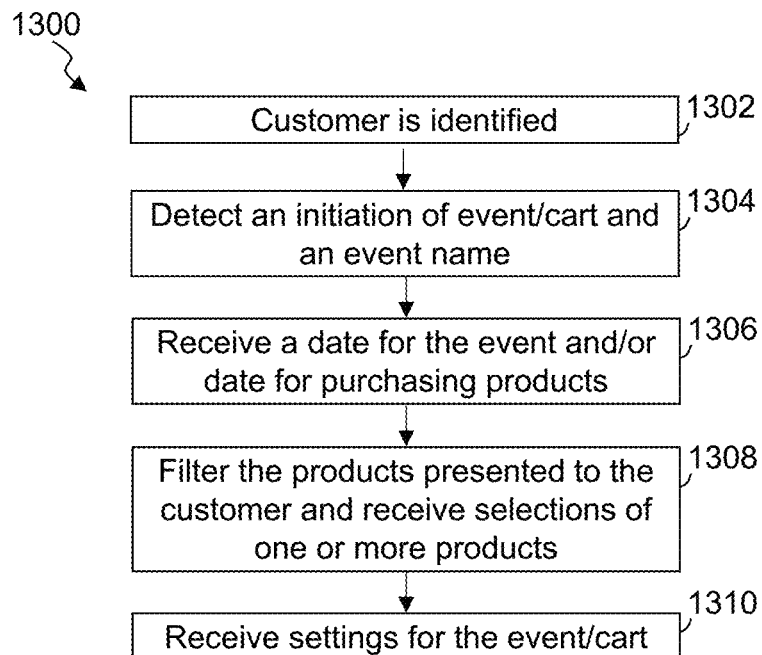
FIG. 13 illustrates a simplified flow diagram of an exemplary process of establishing an event database and/or cart, in accordance with some embodiments.

FIG. 13 illustrates a simplified flow diagram of an exemplary process 1300 of establishing an event database and/or cart, in accordance with some embodiments. In step 1302, a customer is identified (e.g., the customer logs in, provides a customer code, scans a customer card, etc.). In step 1304, the customer requests the creation of a new event by selecting and/or defining an event type, and typically names the event. In step 1306, the customer specifies a date of the event and/or a date by which products are to be purchased for the event. In step 1308, the system filters the potential products based on the type of event and presents products to the customer for selection allowing the customer to select one or more products relative to the event. As indicated above, some embodiments provide multiple levels of categories and sub-categories to help the customer navigate through types of products. In step 1310, the customer can specify settings of the event, such as budget, numbers of attendees, and other such information.

Figure 14:
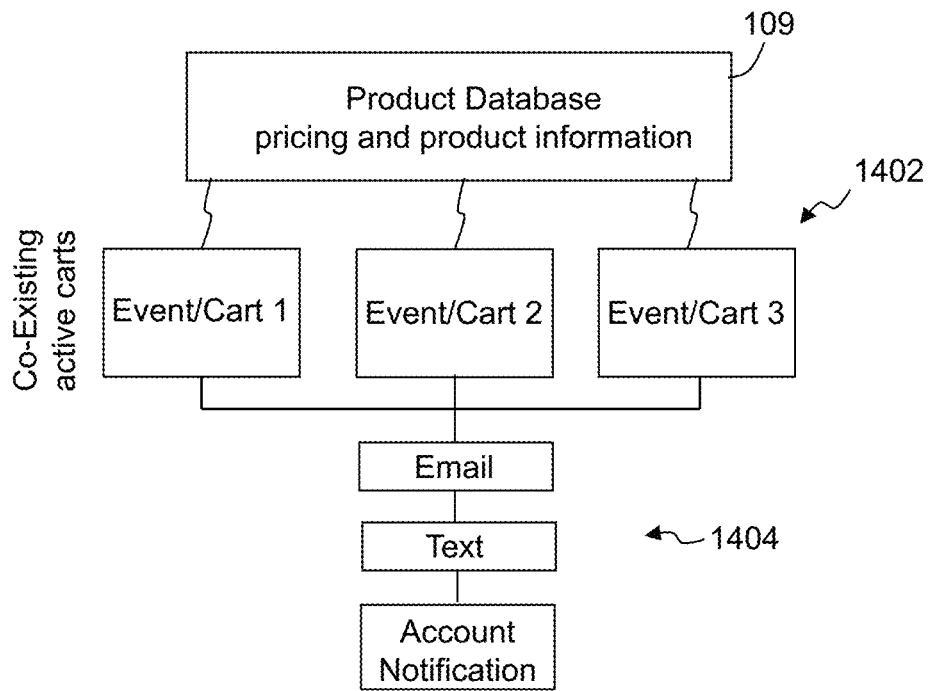
FIG. 14 illustrates a simplified block diagram of an exemplary representation of multiple events and/or carts being simultaneously active for a particular customer, in accordance with some embodiments.

FIG. 14 illustrates a simplified block diagram of an exemplary representation of multiple events and/or carts being simultaneously active for a particular customer, in accordance with some embodiments. As described above, the customer can establish multiple different pending events. In some embodiments, the system establishes a corresponding cart 1402 for each of those events and tracks the pricing and/or budget relative to selected products. The system continues (e.g., periodically, based on a schedule, based on a detected change of a price for a product, etc.) to access the dynamic product databases 109 and information to determine pricing. Changes can be reflected in the carts when the customer account and graphical user interface is accessed. Again, the graphical user interface may be communicated to the customers computing device, data may be communicated that is used by a local software application (APP) operating on the customer computer device, and/or other such methods of displaying the one or more graphical user interfaces. In some embodiments, the system can provide the customer with one or more notifications 1404 of changes in pricing, product availability, alternative product recommendations, and/or other such information. Such notifications can be by email, text message, phone message, displayed through the graphical user interface, presented through an application on the customer's computing device, other such methods or a combination of two or more of such methods. In some embodiments, the customer can specify one or more preferred methods of communication.

Figure 15:
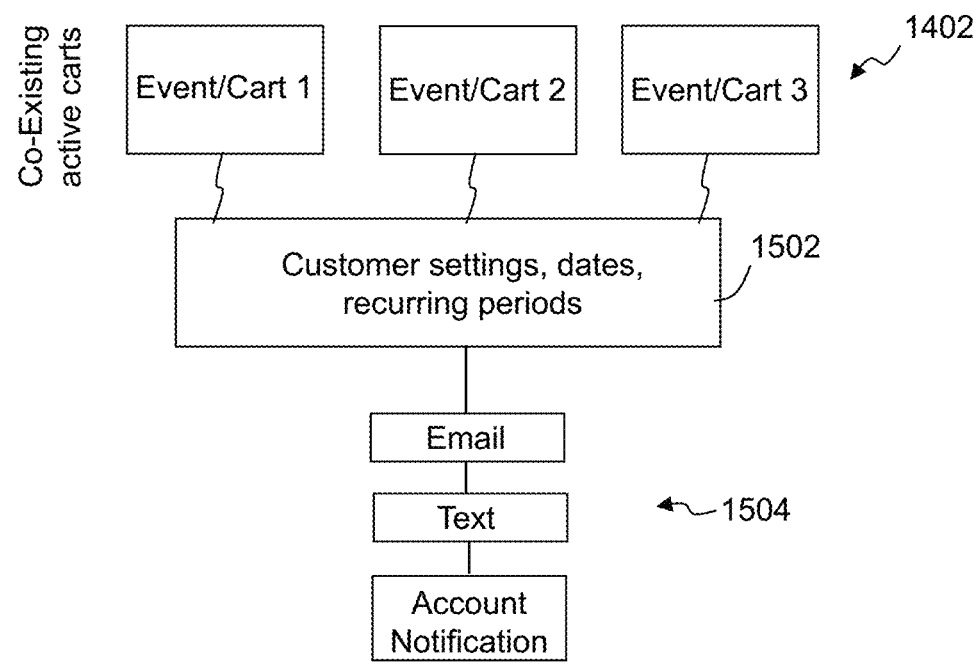
FIG. 15 illustrates a simplified block diagram of an exemplary representation of a system tracking multiple simultaneously active events and/or carts for a particular customer, in accordance with some embodiments.

FIG. 15 illustrates a simplified block diagram of an exemplary representation of a system tracking multiple simultaneously active events 1402 and/or carts for a particular customer, in accordance with some embodiments. The multiple carts are active and the system uses the customer specified settings 1502 (e.g., date, time, location, etc.) to evaluate when products should be purchased for the event. When the system identifies a window of purchase, one or more notifications 1504 can be communicated to the customer.

In some embodiments, the system enables customer to plan and budget events, while maintaining multiple shopping carts simultaneously active. These carts can be active for substantially any period of time, and in some applications may notify the customer when the event has been active for more than a threshold period of time without activity. The system can provide increased revenue per customer, while providing targeted cross-selling. Further, the system in some applications can provide price change indicators, alerts and other notifications (e.g., via email, text, in-context messaging, etc.). The system can use a customer's address and/or delivery address along with products selected for a particular item and date of the event to predict an optimal window of time to place an order and/or purchase a product. In some instances, the system can propose delivery as an option for timely delivery versus pickup or shipping (especially for products with limited shelf life), pre-order for a future date, and the like. Further, by applying the filtering based at least on the events, the system can identify relevant product categories, subcategories and products available through an online shopping system of the retailer (e.g., website) to enable customer to see products relevant to the event being planned and select products revenant to that event in providing purpose based shopping. The system can maintain multiple shopping carts to co-exist at any given point-in-time for a customer, which in turn can be checked out when a customer is ready. Some of these carts may be setup as recurring cart purchases, e.g. weekly or monthly shopping, while others are single instance events.

In some embodiments, systems, apparatuses and corresponding methods performed by the systems manage databases for multiple event shopping. Some of these embodiments comprise: a plurality of geographically distributed database management systems configured to maintain customer database information corresponding to thousands of different registered customers and product database information corresponding to hundreds of thousands of retail products offered for sale from a retail store entity, the database management system comprising: a management control circuit; a filter control circuit communicatively coupled with the management control circuit; customer event databases each corresponding to one of the registered customers and exclusively associated with one of one or more customer identified events that a corresponding customer is planning; and a plurality of product databases maintaining current product information sets each corresponding to one of the hundreds of thousands of products, wherein each product information set comprises: product information corresponding to one of the hundreds of thousands of retail products, and an association to at least one of a plurality of different event filter categorizations; wherein the filter control circuit is configured to filter product information sets based on a set of predefined event attributes and customer specified attributes maintained within a first customer event database exclusively associated with the customer and a first event of the plurality of events, and identify a limited subset of products, of the hundreds of thousands of available products offered for sale by the retail entity, that are relevant to the customer specified first event; wherein the management control circuit is configured to: maintain the plurality of customer event databases exclusively associated with a first customer of the registered customer; cause a graphical user interface, displayed through a customer computing device, to limit a display of potential products to display a subset of product representations, of hundreds of thousands of potential product representations of the hundreds of thousands of products offered for sale by the retail entity, wherein each product representation of the subset of product representations corresponds to one of the subset of products to be considered for purchase by the first customer for use with the first event; and incorporate within a first event database of the plurality of customer event databases, which corresponds to the first event exclusively associated with the first customer, a product identifier for each selected product from the subset of products that are selected by the first customer and intended to be purchased and used by the first customer for the first event.

Further, some embodiments provide methods of managing databases for multiple event shopping, comprising: maintaining a plurality of customer event databases exclusively associated with the first customer, wherein each of the plurality of event databases corresponds to one of a plurality of customer identified events the first customer is planning; filtering product information sets based on a set of predefined event attributes and customer specified attributes maintained within a first customer event database exclusively associated with the customer and a first event of the plurality of events, and identifying a limited subset of products, of the hundreds of thousands of available products offered for sale by the retail entity, that are relevant to the customer specified first event; causing a graphical user interface, displayed through a customer computing device, to limit a display of potential products to display a subset of product representations, of hundreds of thousands of potential product representations of the hundreds of thousands of products offered for sale by the retail entity, wherein each product representation of the subset of product representations corresponds to one of the subset of products to be considered for purchase by the first customer for use with the first event; and incorporating within a first event database of the plurality of customer event databases, which corresponds to the first event exclusively associated with the first customer, a product identifier for each selected product from the subset of products that are selected by the first customer and intended to be purchased and used by the first customer for the first event.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system to manage databases for multiple event shopping, comprising:
    a plurality of geographically distributed database management systems configured to maintain customer database information corresponding to thousands of different registered customers and product database information corresponding to hundreds of thousands of retail products offered for sale from a retail entity, each of the database management systems comprising:
        a management control circuit;
        a filter control circuit communicatively coupled with the management control circuit;
        customer event databases each corresponding to a respective one of the registered customers and exclusively associated with one of a plurality of events; and
        a plurality of product databases maintaining current product information sets each corresponding to one of the hundreds of thousands of products, wherein each product information set comprises: product information corresponding to one of the hundreds of thousands of retail products, and an association to at least one of a plurality of different event filter categorizations;
    wherein the filter control circuit is configured to filter product information sets based on a set of predefined event attributes and customer specified attributes maintained within a first customer event database exclusively associated with a customer and a first event of the plurality of events, and identify based on the filtering a limited subset of products, of the hundreds of thousands of available products offered for sale by the retail entity, that are relevant to the customer specified first event;
    wherein the management control circuit is configured to:
        simultaneously maintain a first plurality of customer event databases, of the customer event databases, exclusively associated with a first customer of the registered customers and corresponds to one of the plurality of events corresponding to the first customers;
        cause a graphical user interface, displayed through a customer computing device, to limit a display of potential products to display, based on the limited subset of products identified in response to the filtering, a subset of product representations, of hundreds of thousands of potential product representations of the hundreds of thousands of products offered for sale by the retail entity, wherein each product representation of the subset of product representations corresponds to one product of the limited subset of products to be considered for purchase by the first customer in association with the first event; and
        incorporate within a first event database of the first plurality of customer event databases, which corresponds to the first event exclusively associated with the first customer, a product identifier for each selected product from the subset of product representations that are selected by the first customer in association with the first event and intended to be purchased by the first customer.

2. The system of claim 1, wherein the management control circuit is configured to receive a first event budget defined by the customer that is specific for the first event; incorporate the first event budget into a budget record of the first event database; obtain, for each of the selected products, from product information a current cost; and cause the graphical user interface to graphically represent a relationship between a current total cost, defined by sum of the current cost for each of the selected products, and the first event budget.

3. The system of claim 2, wherein the filter control circuit is configured to identify when one of the selected products is offered at a reduced cost; and notify the customer of the reduced cost, and the change in total cost relative to the first event budget.

4. The system of claim 2, wherein the management control circuit is configured to determine a purchase timing for each of the selected products; evaluate each of the purchase timing relative to a scheduled event time attribute defined by the customer; and notify the customer of a recommended purchase date for each of one or more of the selected products as a function of the corresponding purchase timing.

5. The system of claim 2, wherein the management control circuit is configured to cause the graphical user interface to display, in association with the graphically represented relationship between the current total cost and the first event budget, a plurality of image representations of at least a subset of the selected products representing a reduction in the first event budget; and cause a graphical representation of a proportion of the first event budget is available when the total current cost is less than the first event budget, and an excess graphical representation of a proportional cost in excess of the first event budget when the total current cost exceeds the first event budget.

6. The system of claim 1, wherein the filter control circuit is configured to:
  identify a plurality of product sub-categories associated with the first event;
  display representations of the product sub-categories; and
  obtain, from the product database, sub-category associations for each product of the limited subset of products; and
  wherein the management control circuit in causing the graphical user interface to display the subset of product representations is further configured to cause, in response to a selection of one of the representations of the product sub-categories, a subgroup of the subset of product representations to be displayed that are associated with the selected product sub-category.

7. The system of claim 1, wherein the management control circuit is configured to:
  obtain, as specified by the first customer, a number of attendees predicted to attend the first event;
  cause an estimated purchase quantity of each of the displayed product representations to be displayed in association with the displayed product representations through the graphical user interface; and
  cause an accumulated current cost to purchase the estimated purchase quantity of each of the displayed product representations to be displayed through the graphical user interface in association with the displayed product representations.

8. The system of claim 1, wherein the management control circuit is configured to:
  display through the graphical user interface a pending events option; and
  display a listing of the pending event items each corresponding to one of the plurality of events specified by the customer along with a total current cost defined by a sum of the selected products intended for the corresponding one of the plurality of events, wherein each pending event item is selectable to cause the graphical user interface to display event information exclusively associated with a selected one of the plurality of events corresponding to the selected one of the pending event items.

9. The system of claim 8, wherein the management control circuit is further configured to display a total count of all products included in each of the customer event databases associated with the first customer.

10. The system of claim 8, wherein two or more of the plurality of events correspond to different dates when products associated with a respective one of the two or more of the plurality of events are recommended to be purchased.

11. The system of claim 8, wherein the management control circuit is further configured to check-out each of the plurality of events independently and at different times to complete purchases of the products associated with the respective one of the plurality of events.

12. The system of claim 8, wherein the management control circuit is further configured to separately modify and update independently the plurality of event databases in response to respective actions received through the graphical user interface by the first user and corresponding to a respective one of the plurality of events.

13. The system of claim 12, wherein the management control circuit is further configured to receive a selection through the graphical user interface providing an events user interface to modify a number of a first product to be included in the first event, and modify the first event database to specify the modified number specific to the first product.

14. A method of managing databases for multiple event shopping, comprising:
  simultaneously maintaining a first plurality of customer event databases exclusively associated with a first customer, wherein each of the plurality of event databases corresponds to one of a plurality of events corresponding to the first customer;
  filtering product information sets based on a set of pre-defined event attributes and customer specified attributes maintained within a first customer event database, of the first plurality of customer event databases, exclusively associated with the first customer and a first event of the plurality of events corresponding to the first customer, and identifying based on the filtering a limited subset of products, of the hundreds of thousands of available products offered for sale by a retail entity, that are relevant to the first event;
  causing a graphical user interface, displayed through a customer computing device, to limit a display of potential products to display, based on the limited subset of products identified in response to the filtering, a subset of product representations, of hundreds of thousands of potential product representations of the hundreds of thousands of products offered for sale by the retail entity, wherein each product representation of the subset of product representations corresponds to one product of the limited subset of products to be considered for purchase by the first customer for use with the first event; and
  incorporating within a first event database of the first plurality of customer event databases, which corresponds to the first event exclusively associated with the first customer, a product identifier for each selected product from the subset of product representations that are selected by the first customer in association with the first event and intended to be purchased by the first customer.

15. The method of claim 14, further comprising:
  receiving a first event budget defined by the customer that is specific for the first event;
  incorporating the first event budget into a budget record of the first event database;
  obtaining, for each of the selected products, from product information a current cost; and
  causing the graphical user interface to graphically represent a relationship between a current total cost, defined by sum of the current cost for each of the selected products, and the first event budget.

16. The method of claim 15, further comprising:
identifying when one of the selected products is offered at a reduced cost; and
notifying the customer of the reduced cost, and the change in total cost relative to the first event budget.

17. The method of claim 15, further comprising:
determining a purchase timing for each of the selected products;
evaluating each of the purchase timing relative to a scheduled event time attribute defined by the customer; and
notifying the customer of a recommended purchase date for each of one or more of the selected products as a function of the corresponding purchase timing.

18. The method of claim 15, further comprising:
causing the graphical user interface to display, in association with the graphically represented relationship between the current total cost and the first event budget, a plurality of image representations of at least a subset of the selected products representing a reduction in the first event budget; and
causing a graphical representation of a proportion of the first event budget is available when the total current cost is less than the first event budget, and an excess graphical representation of a proportional cost in excess of the first event budget when the total current cost exceeds the first event budget.

19. The method of claim 14, further comprising:
obtaining, as specified by the first customer, a number of attendees predicted to attend the first event;
causing an estimated purchase quantity of each of the displayed product representations to be displayed in association with the displayed product representations through the graphical user interface, and causing an accumulated current cost to purchase the estimated purchase quantity of each of the displayed product representations to be displayed through the graphical user interface in association with the displayed product representations.

20. The method of claim 14, further comprising:
displaying through the graphical user interface a pending events option; and
displaying a listing of the pending event items each corresponding to one of the pending events specified by the customer along with a total current cost defined by a sum of the selected products intended for the corresponding one of the pending events, wherein each pending event item is selectable to cause the graphical user interface to display event information exclusively associated with a selected one of the pending events corresponding to the selected one of the pending event items.

* * * * *